United States Patent [19]

Ali

[11] 4,243,676
[45] Jan. 6, 1981

[54] PROCESS FOR PREPARING OVERBASED NAPHTHENIC MICRONUTRIENT COMPOSITIONS

[75] Inventor: Wahid R. Ali, Pointe-a-Pierre, Trinidad and Tobago

[73] Assignee: Texaco Trinidad, Inc., Pointe-a-Pierre, Trinidad and Tobago

[21] Appl. No.: 40,008

[22] Filed: May 17, 1979

[51] Int. Cl.³ .................... A01N 55/02; A01N 37/00; A01N 59/20; A01N 59/16
[52] U.S. Cl. .................................. 424/294; 424/143; 424/144; 424/147; 424/287; 424/295; 424/315
[58] Field of Search ............... 424/294, 143, 144, 147, 424/287, 295, 315

[56] References Cited

U.S. PATENT DOCUMENTS

| | | | |
|---|---|---|---|
| 2,865,956 | 12/1958 | Ellis et al. | 260/504 |
| 2,938,828 | 5/1960 | Vander Waarden et al. | 424/294 |
| 3,061,508 | 10/1962 | Morriss et al. | 424/294 |
| 3,661,550 | 5/1972 | Downer et al. | 71/27 |
| 4,003,994 | 1/1977 | Downer et al. | 424/157 |
| 4,125,395 | 11/1978 | Downer et al. | 424/356 |

Primary Examiner—Douglas W. Robinson
Attorney, Agent, or Firm—Carl G. Ries; Robert A. Kulason; Henry W. Archer

[57] ABSTRACT

In a process for preparing overbased oil soluble naphthenates of molybdenum, copper, manganese and iron, wherein a metal sulfate is one of the reagents and an alkali metal sulfate is one of the products, cake formation which blocks reactor discharge lines is eliminated by maintaining the alkali metal sulfate as an aqueous solution and removing this solution from the reactor.

6 Claims, No Drawings

PROCESS FOR PREPARING OVERBASED NAPHTHENIC MICRONUTRIENT COMPOSITIONS

BACKGROUND OF THE INVENTION

1. Field of the Invention

This invention relates to an improved, process for preparing nonphytotoxic micronutrient compositions in horticultural spray oils. As a result of the improvement disclosed herein, blockage of the discharge lines of the reaction vessel by one of the byproducts of the process is eliminated thereby improving the overall economics of the process.

2. Description of the Prior Art

Coassigned U.S. Pat. Nos. 4,003,994 and 4,125,395 describe metathetical processes for preparing a micronutrient compostition containing an overbased oil soluble naphthenate of molybdenum, copper, zinc, manganese and iron by reacting a solution of naphthenic acids having a molecular weight ranging from about 200 to about 620 in a light aromatic solvent of low viscosity having a boiling point ranging up to about 300° F. with alcoholic solutions of alkali hydroxide and of an inorganic salt of the selected metal, water being added and/or the hydrated inorganic salt being used in the case of manganese; the ratio of equivalents of metal to naphthenic acid being from about 1 to about 20; distilling off the solutions including some of the aromatic solvent, mixing with the remainder a horticultural spray oil comprising a nonphytotoxic hydrocarbon mineral oil having a minimum API gravity of 27; a viscosity at 100° F. of between 55 and 100 SUS; and a boiling point range between about 85° and 775° F., removing substantially all the aromatic hydrocarbon solvent in the resulting mixture by vacuum distillation up to a liquid temperature not greater than 130° C., and giving the resulting composition a final polishing by removing any fine particles by centrifugation.

As above described the metathetical route is a highly versatile one for preparing overbased metal salts. It enables basically the same equipment and procedure to be used for preparing a wide variety of overbased metal salts. Usually the metal salt feedstock is the chloride as this is generally soluble in methanol. The system may contain little or no water. Practical problems are encountered when attempts are made to use the cheaper metal sulphate as the source of the metal. The economic advantages of using the sulfate can be appreciated by considering the prices published in the "Oil, Paint and Drug's Chemical Marketing Reporter", July 10, 1978. As shown below, copper, ferrous and manganous sulphates are substantially cheaper than the corresponding chlorides and also provide cheaper sources of the metal.

| Item | Price per 100 pounds (US,$) |
|---|---|
| 1.1 $CuSO_4 \cdot 5H_2O$ (Published Price) | 35.45 |
| 1.2 $CuCl_2$ (Published Price) | 90.00 |
| 1.3 Elemental Cu, Basis $CuSO_4 \cdot 5H_2O$ price | 103.52 |
| 1.4 Elemental Cu, Basis $CuCl_2$ price | 190.57 |
| 2.1 $FeSO_4$ (Published Price) | 2.60 |
| 2.2 $FeCl_2$ (Published Price) | 4.70 |
| 2.3 Elemental Fe, Basis $FeSO_4$ price | 7.07 |
| 2.4 Elemental Fe, Basis $FeCl_2$ price | 10.68 |
| 3.1 $MnSO_4$ (28% Mn, gran.; Published Price) | 5.50 |
| 3.2 $MnCl_2$ Published Price | 31.00 |

-continued

| Item | Price per 100 pounds (US,$) |
|---|---|
| 3.3 Elemental Mn, Basis $MnSO_4$ price | 19.64 |
| 3.4 Elemental Mn, Basis $MnCl_2$ price | 71.06 |

SUMMARY OF THE INVENTION

In accordance with the invention, there is provided a process for preparing a micronutrient composition containing an overbased oil soluble naphthenate of a metal selected from the group of molybdenum, copper, manganese and iron comprising reacting at ambient temperature and pressure a solution of naphthenic acids having a molecular weight ranging from about 200 to about 620 in a light aromatic solvent of low viscosity having a boiling point ranging up to about 300° F. with an alcoholic solution of alkali metal hydroxide and an aqueous solution of the sulfate of the selected metal, the ratio of equivalents of metal to naphthenic acid being from about 1 to about 20; distilling substantially all of the alcohol from the reaction mixture, some of the aromatic solvent and of the water present but retaining enough water in the system to keep the resulting alkali metal sulfate in aqueous solution; continuing the distillation until the distillation temperature reaches the boiling point of the aromatic solventwater azeotrope; and separating an aqueous phase containing the alkali metal sulfate from an organic phase containing the desired overbased naphthenate. The alkali metal sulphate is kept in solution by ensuring that there is sufficient water present to solubilise the sulphate formed. The quantity of sulphate produced in the reaction is known, so the amount of water required for solubilisation can easily be calculated from solubility tables. Usually an excess of water is added initially, as a solvent for the alkali hydroxide reactant. However if too much water has distilled, it can easily be replaced while the distillation is in progress. The water content is not critical but sufficient water must be present to ensure a true solution of the alkali metal sulphate.

To make a spray oil composition, there is mixed with the organic phase a horticultural spray oil comprising a nonphytotoxic hydrocarbon mineral oil having a minimum API gravity of 27; a viscosity at 100° F. of between 55 and 100 SUS: and a boiling point range between about 85° and 775° F., followed by removing substantially all the aromatic hydrocarbon solvent from the resulting mixture by vacuum distilling up to a liquid temperature not exceeding 130° C., and giving the residual spray oil composition a final polishing by removing any fine particles by high speed centrifuging. The metal naphthenates are blended in the product spray oil at a metal concentration of between about 0.025 to 8.0 percent weight/volume.

Sodium hydroxide is the preferred alkali metal hydroxide used but other alkali metal hydroxides such as potassium hydroxide also are suitable.

The naphthenic acids employed in the preparation of the overbased salts of the present invention are aliphatic cyclic hydrocarbon carboxylic acids that are usually obtained by treating a naphthenic crude oil or fractions thereof with a caustic solution to form naphthenates that are soluble in aqueous solution. Such acids are described in greater detail in Kirk-Othmer, "Encyclopedia of Chemical Technology", Interscience Encyclopedia Co., 1952, Vol. 9, starting at page 241. In the present invention, acids having a molecular weight in the range of 200 to 600, are used. These acids can also be characterized by their acid value expressed in terms of milligram equivalents of KOH. The acids may require to be deoiled and distilled before use if significant amounts of phenolic material are known to be present therein.

The preferred horticultural spray oil used is a hydrocarbon mineral oil having a gravity API of 31–36, a viscosity at 100° F. of 81 to 87 Saybolt Universal Seconds and a boiling range between 600° and 775° F. However, for normal applications, highly refined carrier oils, of a predominantly paraffinic nature, having a minimum API gravity of 27, a viscosity at 100° F. of between 55 and 100 Saybolt Universal Seconds, a boiling range of 600°–775° F. and a minimum unsulphonated residue of 85%, are suitable. A lighter oil with an API gravity around 50 and a boiling point range of 85°–600° F. belonging to the general groups of paraffins, isoparaffins and/or naphthenes is desirable for use with light-weight ultra low volume sprayers.

For comparative purposes, the prior art procedure for carrying out the reaction for making overbased cupric naphthenates from cupric chloride is given below. Details of the chargestock, conditions, recovery, etc. are shown in Table I. The preparation is carried out in the pilot plant using a Pfaudler glass-lined reactor equipped with steam jacket, anchor-type stirrer, and baffles, to which an overhead condenser is added. The methanolic cupric chloride and sodium hydroxide solutions are added over 75 minutes to the xylene naphthenic acid solution, and when the addition is completed, the mixture is stirred for an additional 60 to 90 minutes. Methanol is then distilled and this is followed by the water, formed in the reaction, which is distilled as an azeotrope with xylene. The distillation residue is centrifuged to remove sodium chloride precipitate and the centrifugate blended with spray oil before distilling the xylene under reduced pressure. The residue from this distillation is the required product. As may be seen from the Table, the yields are quite good.

The above procedure is typical of that used for preparing the various overbased metal naphthenates by the metathetical route. Usually only minor variations are required in order to obtain satisfactory yields of desired product. When however, and as before indicated, the metal sulphate is used as the feedstock, considerable practical problems may be encountered. Table II contains details of chargestock, conditions, recovery etc. for preparing overbased cupric naphthenates from cupric sulphate. Because the latter is insoluble in methanol, it has to be dissolved in water and charged to the reaction as an aqueous solution. At the end of the reaction, the water has to be removed from the product, otherwise it would solubilize the sodium sulphate that is formed in the reaction, and remain as an emulsion. The removal of water may be achieved conveniently by azeotropic distillation in a Dean & Stark type arrangement. In this distillation, the azeotrope is condensed as a xylene/water mixture from which the water is separated and the xylene returned to the distillation to enable the azeotroping to continue. When the water is completely removed, the residue from the distillation is worked-up as described above for the cupric chloride route.

The problems with which this invention is concerned are encountered in removing the residue from the reactor after the distillation of the methanol and xylene/water azeotrope. In run 1 (Table II), the exit lines and bottom of the reactor were blocked by a heavy encrustation of sodium sulphate. The latter is formed in the reaction and kept as an aqueous solution until the water is distilled. The sodium sulphate is then deposited as a precipitate, blocking the exit lines. Attempts to clear the blockage resulted in spillage and the yields in Run 1 based on conversion of copper and naphthenic acids were reduced to approximately 85%. In Run 2, the exit lines were again blocked, and, in order to reduce spillage, the reaction product had to be siphoned. Conversions of copper and naphthenic acid to naphthenates were both 97%. In both runs, product quality was excellent.

Clearly, siphoning of the product is an unsatisfactory working-up procedure. The sodium sulphate itself forms a very hard cake at the bottom of the vessel as well as inside the exit lines. The cake cannot be easily broken. Nor can the supernatant liquid seep through it at any appreciable rate. From a process standpoint, it is therefore essential that cake formation be avoided.

In an example of the practice of the process of this invention, 41 g. of naphthenic acids in 550 g of xylene, and 28.8 g of NaOH in 320 g of methanol were charged to a reaction vessel over a one and a half hour period. To this mixture was added a solution of 90 g of $CuSO_4 \cdot 5H_2O$ in 320 g of water. Stirring was continued for an hour and a half after all the reagents had been charged. The mixture was distilled at atmospheric pressure to remove most of the methanol and some of the xylene and water. The distillation was continued until the temperature reached 91.5° C., the boiling point of the xylene water azeotrope. Next, 250 ml of water added. There occured a phase separation and the aqueous phase containing $Na_2SO_4$ was run off leaving an organic phase containing the overbased metal naphthenate. 125 ml of spray oil were added to the organic phase and the resulting mixture was distilled under vacuum to remove all the xylene. The residue spray oil composition was then centrifuged in a Sharples centrifuge to give it a final polishing by removing any remaining fine particles. The results obtained were similar to those of run No 2. Advantageously, in the present process, solid formation is eliminated completely. This is made possible by maintaining the salt in a aqueous solution and physically separating the latter. The separation is done after distilling the methanol. Several runs were done attempting to achieve a neat separation. Initially success was sometimes obtained, while at other times, emulsions were encountered and separation of the phases would be impractical. Unexpectedly, it was discovered that the way to obtain clean separations consistently required removing of the methanol completely during the distillation, just prior to the phase separation.

In the distillation which takes place without a fractionation column, the alcohol (methanol) initially comes over pure. However as the distillation proceeds a ternary mixture of methanol, xylene and water distills. At this stage the methanol is removed at a slower rate, and complete removal may take a considerable time. It is necessary to ensure that the distillation is continued until all the methanol is removed, with the distillation temperature reaching 91.5° C. (boiling point of the xylene/water azeotrope). More water is added, if required, to maintain the sodium sulphate in solution and is mixed with the reaction mixture. Only at this stage can the distillation be stopped. The phase separation is carried out after a settling period of approximately 5 minutes or less.

Advantageously, the basket centrifuging stage with the zinc and cupric naphthenates prior art process using metal chloride reactants is now eliminated. This is an improvement from a process standpoint. The present phase separation technique is limited to those overbased metal salts which do not emulsify with water, and cannot be used, for instance, with overbased zinc naphthenates.

Obviously, many modifications and variations of the invention, as hereintherefore set forth, may be made without departing from the spirit and scope thereof and, therefor, only such limitations should be imposed as are indicated in the amended claims.

TABLE I

PREPARATION OF NOMINAL 800% OVERBASED COPPER NAPHTHENATES CONCENTRATE IN SPRAY OIL

| | Run No. | |
|---|---|---|
| | 3 | 4 |
| Charge | | |
| (i) Naphthenate acids, kg. | 10.2 | 10.2 |
| in Xylene, I.G. | 34.8 | 34.8 |
| (ii) Sodium Hydroxide, kg. | 7.2 | 7.2 |
| in Methanol, I.G. | 22.3 | 22.3 |
| (iii) Cupric chloride, kg. | 12.1 | 12.1 |
| in Methanol, I.G. | 22.3 | 22.3 |
| (iv) Spray oil, I.G. | 10.4 | 10.4 |
| Conditions | | |
| Addition time of reagents, mins. | 75 | 75 |
| Extra stirring time after addition of reagents, mins. | 60 | 90 |
| Work-up | | |
| (i) Solids ex Centrifuge, kg. | 9.8 | 9.8 |
| Copper content of solids, Kg. | 0.5 | 0.2 |
| (ii) Product | | |

TABLE I-continued

PREPARATION OF NOMINAL 800% OVERBASED COPPER NAPHTHENATES CONCENTRATE IN SPRAY OIL

| | Run No. | |
|---|---|---|
| | 3 | 4 |
| Weight, Kg. | 58.6 | 65.8 |
| Density, g/ml | 0.970 | 0.955 |
| Viscosity, SUS at 100° F. | 179.6 | 130.3 |
| Copper content g/100 ml | 8.7 | 8.0 |
| Naphthenate content, m.eq/100 ml | 32.2 | 28.7 |
| Overbasicity, % | 750 | 777 |
| Chloride content, g/100 ml | N.D.[a] | 0.066 |
| Summary | | |
| Copper charged, Kg. | 5.73 | 5.73 |
| Copper recovered, | | |
| (i) in product, Kg. | 5.25 | 5.52 |
| (ii) in salts, Kg. | 0.49 | 0.21 |
| (iii) total, Kg. | 5.74 | 5.73 |
| total, % | 100 | 100 |
| Utilisation of Copper, % | 91.8 | 96.3 |
| Naphthenates recovered | | |
| (i) in product, g. eq. | 19.42 | 19.77 |
| (ii) in salts, g.eq. | 0.59 | 0.29 |
| (iii) total, g.eq. | 20.01 | 20.06 |
| total, % | 100 | 100 |
| Utilisation of Naphthenates % | 97.1 | 98.9 |

[a]N.D. not determined.

TABLE II

PREPARATION OF NOMINAL 800% OVERBASED CUPRIC NAPHTHENATES CONCENTRATES IN SPRAY OILS USING CUPRIC SULPHATE

| | Run No. | |
|---|---|---|
| | 1 | 2 |
| Charge | | |
| (A) Naphthenate acids | 10.24 | 10.24 |
| Dissolved in Xylene, I.G. | 34.8 | 34.8 |
| (B) Sodium Hydroxide, Kg. | 7.2 | 7.2 |
| Dissolved in Methanol, I.G. | 22.3 | 22.3 |
| (C) Cupric Sulphate Pentahydrate, Kg. | 22.46 Kg.[a] | 22.46[a] |
| Dissolved in Water, I.G. | 22.3 | 22.3 |
| (D) Spray oil[b], I.G. | 10.4 | 10.4 |
| Reaction Conditions | | |
| Addition Time of (B) and (C), hr. | 1.5 | 1.5 |
| Extra Reaction Time, after addition of (B) and (C), hr. | 1.5 | 1.5 |
| Reaction Temperature | Ambient[c] | Ambient[c] |
| Product Recovery and Analysis | | |
| Weight, Kg. | 69.2 | 66.2 |
| Density, g./ml. | 0.938 | 0.952 |
| Viscosity, SUS at 100° F. | 137.1 | 142.3 |
| Copper Content, g./100 ml. | 6.6 | 8.0 |
| Naphthenate Content, m.eq./100 ml. | 22.8 | 27.9 |
| Overbasicity, % | 810 | 802 |
| Sodium Sulphate Recovered, weight Kg. | 3.1[d] | 9.2[d] |
| Copper content of Na$_2$SO$_4$, %-wt. | 3.5 | Trace |
| Mass Balance | | |
| Conversion of Copper to Naphthnates, % wt. | 85 | 97 |
| Conversion of naphthenic acid to Naphthenates, % wt. | 84 | 97 |

[a]CuSO$_4$. 5H$_2$O charged = 22.46 Kg. containing 5.716 Kg. elemental Cu.
[b]Spray oil added after centrifuging prior to xylene distillation.
[c]Ambient temperature, 30° C.
[d]Much of the Na$_2$SO$_4$ in Run PPCS I was lost, and in Run PPCS II recovery of Na$_2$SO$_4$ was in an aqueous soln. (88.5 Kg.) after the reaction products was removed by siphoning.

What is claimed is:

1. In a process for preparing a micronutrient composition containing an overbased oil soluble naphthenate of a metal selected from the group of molybdenum, copper, manganese and iron by reacting in a reactor having discharge lines at ambient temperature and pressure a solution of naphthenic acids having a molecular weight ranging from about 200 to about 600 in a light aromatic solvent of low viscosity having a boiling point ranging up to about 300° F. with an alcoholic solution of alkali metal hydroxide and an aqueous solution of the sulfate of the selected metal, the ratio of equivalents of metal to naphthenic acids being from about 1 to about 20; the steps of distilling at atmospheric pressure substantially all of the alcohol from the reaction mixture, some of the aromatic solvent and some of the water present but retaining enough water in the system to keep the resulting alkali metal sulfate in aqueous solution; continuing said distillation until the distillation temperature reaches the boiling point of the resulting aromatic solvent-water azeotrope, and separating an aqueous phase containing the alkali metal sulfate from an organic phase containing the desired overbased naphthenate whereby cake formation tending to block said discharge lines is eliminated.

2. The process of claim 1, comprising subsequently mixing with said organic phase a non-phytotoxic hydrocarbon mineral oil having a minimum API gravity of 27; a viscosity at 100° F. of between 55 and 100 SUS; and a boiling point range between about 85° and 775° F., removing substantially all of said aromatic hydrocarbon solvent from the resulting mixture by vacuum distillation up to a liquid temperature not exceeding 130° C., and giving the resulting spray oil a final polishing by removing any fine particles.

3. The process of claim 1, wherein said sulfate is copper sulfate.

4. The process of claim 1, wherein said light aromatic solvent is xylene.

5. The process of claim 1, wherein water is added to the reaction mixture after reaching the boiling point of the azeotrope.

6. The process of claim 1, wherein said fine particles are removed by centrifuging.

* * * * *